May 1, 1928.
M. P. HUBBELL
1,668,317
DRILL CHUCK
Filed Dec. 17. 1926
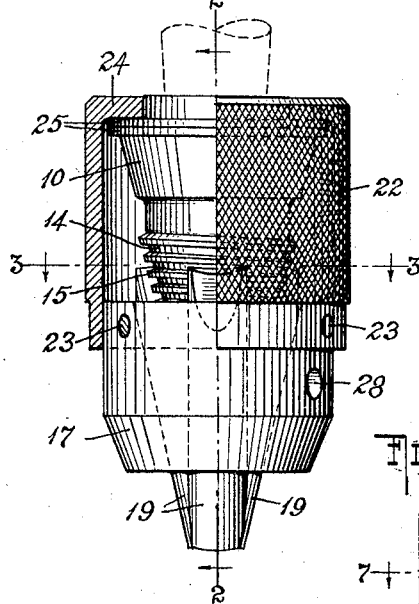
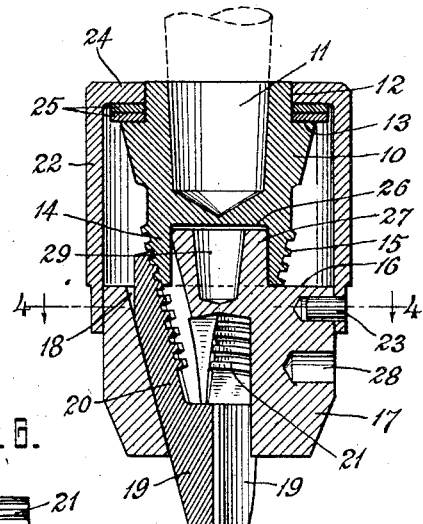
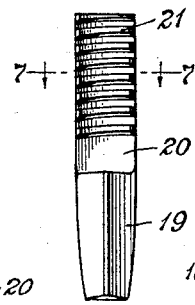
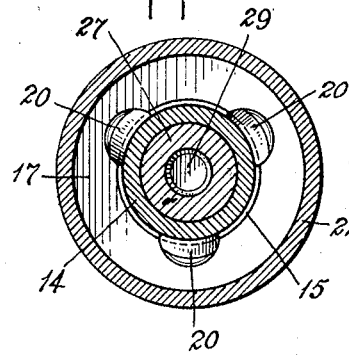
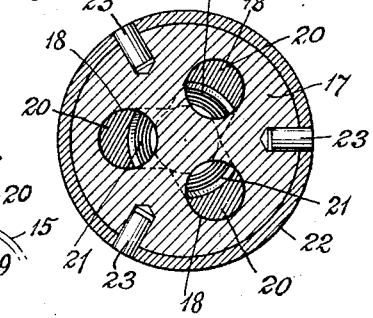
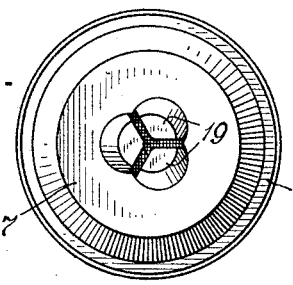
WITNESS
G. V. Rasmussen
INVENTOR
MINOTT P. HUBBELL
BY
ATTORNEYS Patented May 1, 1928.

1,668,317

UNITED STATES PATENT OFFICE.

MINOTT P. HUBBELL, OF ASHBURNHAM, MASSACHUSETTS.

DRILL CHUCK.

Application filed December 17, 1926. Serial No. 155,397.

The invention relates to drill chucks and has for its object to provide a device of this type in which the adjustment of the jaws may be effected in a simple manner without requiring the use of extraneous devices such as keys, and in which the drill or other implement is clamped in the jaws with maximum efficiency. A further object of the invention is to provide a construction in which the manufacturing operations are simplified and in which forces and strains developed during the use of the chuck are absorbed or neutralized. Other more specific objects will appear from the description hereinafter and the features of novelty will be pointed out in the claim.

Reference is to be had to the accompanying drawings which illustrate an example of the invention without defining its limits, in which Fig. 1 is an elevation of the chuck partly in section; Fig. 2 is a longitudinal section thereof on the line 2—2 of Fig. 1; Fig. 3 is a cross-section on the line 3—3 of Fig. 1; Fig. 4 is a similar view on the line 4—4 of Fig. 2; Fig. 5 is an end view of the chuck; Fig. 6 is an elevation of one of the jaws, and Fig. 7 is a detail sectional view on the line 7—7 of Fig. 6.

As shown in the drawings, the chuck comprises a nut 10 having an arbor hole 11 whereby the chuck is mounted upon the lathe or other machine in the conventional manner, and further having a reduced neck 12 at its inner end and an annular shoulder 13 at the base of said neck, the purpose of which will appear hereinafter. At its opposite outer end the nut 10 includes a tapering outer end portion 14 externally screw-threaded, as indicated at 15, the outer end face of the nut 10 being located in abutting engagement with the inner end face 16 of the chuck body 17. The latter is provided with jaw-channels 18 which extend lengthwise through said body and converge toward the outer end face of the body at which end face the jaw-channels terminate. Jaws 19 are movably mounted in the channels 18 and are adjustable lengthwise thereof in directions which converge toward the outer end face of the body, in the manner to be more fully set forth hereinafter. The jaws 19 are provided with stems 20 which comprise preferably integral extensions of said jaws and, in the preferred construction, have their inner surfaces concaved to conform to the radius of the threaded end portion 14 of the nut 10, as diagrammatically illustrated in Fig. 7; upon the concave surfaces the stems 20 are provided with teeth 21 constructed and arranged to mesh with the screw-thread 15 of the nut 10. A sleeve 22 is connected with the body 17 in any conventional manner as, for instance, by means of pins 23 or the like, and projects in an axial direction beyond the body 17 in a manner to completely enclose the nut 10, as shown in Figs. 1 and 2; an annular flange 24 extends inwardly from the sleeve 22 into surface engagement with the neck 12 and in axially spaced relation to the shoulder 13. For the purpose of absorbing and neutralizing strains, and more particularly end thrusts, suitable means may be located between the flange 24 and the shoulder 13; as shown in Figs. 1 and 2, this means consists of hardened metal washers 25, it being understood that these washers may be replaced by other equivalent devices. For the purpose of maintaining the nut 10 and the body 17 in axial alignment and in order to provide a bearing upon which the nut 10 and the body 17 may be relatively rotated, these elements are provided with an axial recess 26 and a cooperating hub 27; in the illustrated example, the axial recess 26 is located in the nut 10 and projects in an axial direction from the outer end face thereof, and the hub 27 is part of the body 17 and projects in an axial direction from the inner end thereof into said recess, as clearly shown in Fig. 2. It will be understood that in some constructions it may be desirable to reverse the location of the recess and hub with respect to the nut 10 and body 17. The body may be provided with peripheral sockets 28 for the accommodation of a suitable implement if additional leverage should be required for rotating said body. To facilitate the manufacture of the chuck, the body 17 may be provided with an arbor recess 29 extending in an axial direction from the end face of the hub 27, as shown in Fig. 2.

Assuming the chuck to be mounted upon a lathe or other machine, it will be obvious, if the body 17 is rotated about its axis and relatively to the nut 10, that the cooperating action of the screw-thread 15 of said nut and the teeth 21 of the jaws 19 will cause the latter to be adjusted either in converging or diverging directions lengthwise of the channels 18 and into and out of gripping engagement with the drill or other tool for which the chuck may be designed. These operations are capable of being accomplished through the medium of the sleeve 22 in a simple and efficient manner, and the use of an implement in the sockets 28 will be required only to start the releasing operation of the chuck and to perhaps complete the final step of the gripping operation thereof. During these rotative adjustments, the co-operating action of the recess 26 and the hub 27 provides a bearing for the rotating element and at the same time maintains the body and the nut in the desired axial alignment. By arranging the nut 10 in abutting engagement with the body 17, a most rigid construction is provided, in which strains, and particularly end thrusts, are absorbed and are not transmitted to the thread 15 or to the teeth 21 of the jaws 19. The latter elements are thus protected against injury and the position of the jaws with respect to each other is maintained against disturbance so that the accuracy of operation of said jaws is positively maintained throughout the life of the chuck. By concaving the inner surfaces of the stems 20 to conform exactly to the radius of the threaded portion 14, the jaws 19, when assembled in the body 17, are positively held against rotation about their own axes and thereby are maintained in positive, proper, operative relation to each other. At the same time the action of the thread 15 upon the teeth 21 is facilitated and jamming of these parts is entirely avoided.

In addition to the above the novel construction provides the further advantage that any tendency of the drill or other tool to slip causes the body 17 to rotate about the threaded portion 14 and thus force the jaws 19 outwardly into increased gripping engagement with said drill or other tool, it being assumed that the spindle or arbor of the lathe on which the chuck is mounted is revolving right hand and that the thread 15 is left hand.

The improved construction provides a chuck of maximum efficiency in which the required elements are reduced to the smallest number and in which manufacturing difficulties are practically done away with. In the chuck illustrated and described herein, the arbor recess 29 may be utilized in the production of the body 17; that is to say, the body may first be turned on an automatic machine, at which time the aforesaid arbor recess 29 is also produced. All other operations, such as drilling and reaming the jaw-channels and the grinding of the peripheral surface of the body as well as the exterior surface of the hub 27, may be performed while the body is mounted through the medium of the arbor recess 29 upon a lathe or other suitable machine. This method insures a uniformly accurate production of bodies and is of considerable practical advantage in manufacturing. In the present arrangement the nut 10 is threaded at its end portion only, and constitutes a modified buttress which insures a maximum of strength and, as previously stated herein, relieves the thread and the cooperating teeth of the jaws from unnecessary strains.

Various changes in the specific form shown and described may be made within the scope of the claim without departing from the spirit of my invention.

I claim:

A key-less chuck comprising a nut having a tapering outer end portion externally screw-threaded and provided in its outer end face with an axial recess of substantial size, a machined body having its inner end face in abutting engagement with the outer end face of said nut and provided with inclined, converging jaw-channels, a hub projecting from the inner end face of said body and fitting in the recess of said nut, said hub being provided with a recess ample in size to have accommodated a holding member in said recess in the machining of the said body, jaws movably mounted in said channels, stems comprising extensions of said jaws and having their inner surfaces threaded to mesh with the threaded end portion of said nut, a reduced neck at the inner end of said nut, a shoulder formed on said nut adjacent said neck, a ferrule fixedly secured to said body and enclosing said nut for rotating said body and jaws relative to said nut whereby said jaws are adjusted lengthwise of said channels, an annular flange extending inwardly from said ferrule into engagement with said reduced neck and forming a bearing for said shoulder, and a bearing member interposed between said shoulder and said flange.

In testimony whereof I have hereunto set my hand.

MINOTT P. HUBBELL.